United States Patent [19]

Kaneko et al.

[11] Patent Number: 5,483,000
[45] Date of Patent: Jan. 9, 1996

[54] VULCANIZABLE RUBBER COMPOSITION

[75] Inventors: Isamu Kaneko, Yamato; Hiroki Kamiya, Yokohama, both of Japan

[73] Assignee: Asahi Glass Company Ltd., Tokyo, Japan

[21] Appl. No.: 402,982

[22] Filed: Mar. 13, 1995

Related U.S. Application Data

[63] Continuation of Ser. No. 150,769, Nov. 12, 1993, abandoned, which is a continuation of Ser. No. 789,927, Nov. 12, 1991, abandoned.

[30] Foreign Application Priority Data

| Nov. 16, 1990 | [JP] | Japan | 2-308614 |
| Nov. 16, 1990 | [JP] | Japan | 2-308617 |
| Feb. 6, 1991 | [JP] | Japan | 3-036759 |
| Jun. 7, 1991 | [JP] | Japan | 3-163720 |

[51] Int. Cl.[6] .................................................. C08L 27/12
[52] U.S. Cl. ................................... 525/102; 525/104
[58] Field of Search ............................... 525/102, 104

[56] References Cited

U.S. PATENT DOCUMENTS

| 4,263,414 | 4/1981 | West | 525/102 |
| 4,314,043 | 2/1982 | Kojima et al. | 525/102 |
| 4,495,247 | 1/1985 | Vasta . | |
| 5,037,868 | 8/1991 | Saito et al. | 524/93 |
| 5,141,991 | 8/1992 | Konno et al. | 525/102 |

FOREIGN PATENT DOCUMENTS

| 731223 | 3/1966 | Canada . |
| 53002 | 6/1982 | European Pat. Off. . |
| 58393 | 8/1982 | European Pat. Off. . |
| 0053002 | 6/1982 | WIPO . |
| 0058393 | 8/1982 | WIPO . |

*Primary Examiner*—Ralph H. Dean
*Attorney, Agent, or Firm*—Oblon, Spivak, McClelland, Maier & Neustadt

[57] ABSTRACT

A vulcanizable rubber composition comprising:

(A) 100 parts by weight of a fluororubber polymer containing at least 10 mol % of vinylidene fluoride as constituting monomer units;

(B) from 0.1 to 300 parts by weight of an organic silicon compound having an amino group; and (C) a vulcanizing agent in an amount sufficient to vulcanize Component (A).

11 Claims, No Drawings

VULCANIZABLE RUBBER COMPOSITION

This application is a Continuation of application Ser. No. 08/150,769, filed on Nov. 12, 1993, now abandoned, which is a Continuation of Ser. No. 07/789,927, filed on Nov. 12, 1991, now abandoned.

The present invention relates to a vulcanizable rubber composition.

Fluororubber is a rubber material which is most advantageously provided with heat resistance, oil resistance and weather resistance and thus has been effectively used as rubber parts for automobiles, such as oil seals, O-rings and fuel hoses. On the other hand, it has a drawback that it is poor in the low temperature flexibility.

Various studies have been made on compositions having silicone rubbers excellent in the low temperature characteristics incorporated, as means to solve such a problem. However, the affinity between the fluororubber and the silicone rubber is practically poor, and it is difficult to obtain a uniform mixture by kneading the two materials. Further, the processability of such a mixture has been practically inadequate.

Further, with a blend composition comprising components having poor covulcanizability to each other, the physical properties obtained by vulcanization are inadequate even if the respective rubber properties are excellent. Heretofore, it has been unsuccessful to obtain a blend composition having the excellent properties of both materials.

The present invention has been made with such technical problems of the prior art as its background. It is an object of the present invention to provide a vulcanizable rubber composition excellent in the roll-mill workability, mechanical strength, heat resistance, low temperature flexibility, oil resistance and weather resistance by chemically bonding a fluororubber and a silicone polymer to substantially improve the microscopic dispersibility of the two materials, so that an unvulcanized rubber composition will undergo no phase separation.

The present invention has been made to solve the above problems, and it provides a vulcanizable rubber composition comprising:

(A) 100 parts by weight of a fluororubber polymer containing at least 10 mol % of vinylidene fluoride as constituting monomer units;

(B) from 0.1 to 300 parts by weight of an organic silicon compound having an amino group; and (C) a vulcanizing agent in an amount sufficient to vulcanize Component (A).

Now, the present invention will be described in detail.

The fluororubber polymer of Component (A) to be used in the present invention, is required to contain at least 10 mol % of vinylidene fluoride as constituting monomer units. This is intended to form a bond with an amino group in the organic silicon compound of Component (B) in accordance with the following formula:

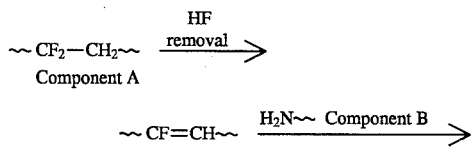

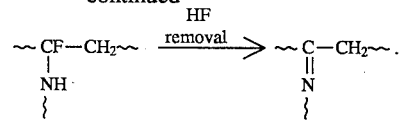

Other unsaturated monomers to be copolymerized with vinylidene fluoride are not particularly restricted. They may, for example, be tetrafluoroethylene, trifluoroethylene, vinyl fluoride, chlorotrifluoroethylene, hexafluoropropylene, perfluorocyclobutylene, perfluoroalkylvinyl ethers, polyfluoroacrylic acid, polyfluorovinyl ether sulfonic acid, polyfluorodienes, ethylene, propylene, or vinyl ethers. These copolymers may be vulcanized by polyhydroxy compounds or polyfunctional amines. However, by introducing unsaturated bonds or halogen atoms such as iodine or bromine, it will be also possible to employ organic peroxide vulcanization. Among commercially available fluororubbers, almost all fluororubbers except for phosphazene type, perfluoro type and tetrafluoroethylene/propylene type, can be used as Component (A) of the present invention.

The silicon compound of Component (B) to be used in the present invention, is a component essential to improve the low temperature flexibility of the fluororubber polymer or to improve the covulcanizability with the silicone rubber. As mentioned above, Components (A) and (B) will be chemically bonded by the reaction of the amino groups in Component (B) with vinylidene fluoride units in Component (A).

Component (B) may, for example, be an organosiloxane of the formula:

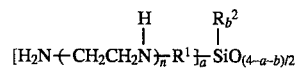

$R^1$ is a bivalent hydrocarbon group, is a $R^2$ is a substituted or unsubstituted monovalent hydrocarbon group, n is 0 or a positive integer of not more than 4, $0<a\leq3$, $0\leq b<3$, and $0<a+b\leq3$, and/or an organosilane of the formula

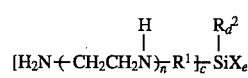

wherein $R^1$, $R^2$ and n are as defined above, X is a hydrolyzable group selected from the group consisting of a hydroxyl group, a halogen atom and a $C_{1-10}$ alkoxy group, c is 1, 2 or 3, d is 0, 1 or 2, e is 1, 2 or 3, and c+d+e=4, or a partial hydrolyzate thereof.

Here, the

group may be bonded to the side chain of the silicone or may be bonded to the terminal thereof. Specifically, it includes:

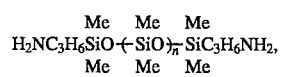

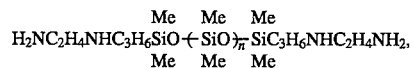

-continued

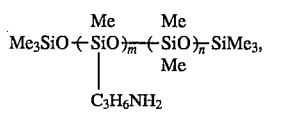

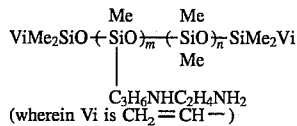
(wherein Vi is $CH_2=CH-$)

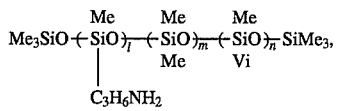

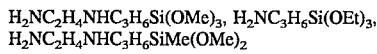

(in the foregoing, Me is a methyl group, and Et is an ethyl group) and partial hydrolyzates of these alkoxysilanes. These compounds may be used alone or in combination as a mixture of two or more of them.

The organic silicon compound of Component (B) preferably contains an alkenyl group in its molecule, so that it is suitable for vulcanization by an organic peroxide as described hereinafter.

The amino group in the organic silicon compound of Component (B) may be a primary or secondary amino group. From the viewpoint of the reactivity with the above fluororubber polymer, a primary amino group is preferred.

The organic silicon compound of Component (B) may have an optional molecular weight ranging from a liquid compound with a molecular weight of about 1,000 to a rubber-like compound with a molecular weight of about 10,00,000.

Further, the organic silicon compound of Component (B) preferably has an amine equivalent of from 500 to 100,000. If the amine equivalent is lower than this range, the amino group content tends to be so large that when reacted with Component (A), Component (A) tends to be cross-linked, whereby during kneading Components (A) and (B), gellation is likely to occur, thus leading to a deterioration of processability, and the properties of vulcanized rubber tend to be poor. If the amine equivalent exceeds 100,000, the reaction sites with the fluororubber tend to be too small in number, and the situation tends to be similar to a case where a mere organopolysiloxane is mixed, and the composition tends to be a blend product having poor compatibility such that bleeding out is likely to occur after kneading.

As the organic silicon compound of Component (B), a compound containing, in addition to an amino group, a nitrogen-containing functional group having a reactivity different from said amino group, may be used. Such a compound functions also as a vulcanizing agent by itself. Otherwise, a compound containing a nitrogen-containing functional group having a reactivity different from the amino group of Component (B), may be added as Component (B'). In this case, Component (B') functions also as a vulcanizing agent by itself.

Here, the nitrogen-containing functional group may be a primary amino group or an imino group. The imino group may be a group of the formula —NH— or =N—. The imino group of the formula —NH— may, for example, be an imino group in a carbamate bond (—NHCOO). The imino group of the formula =N— may be an imino group of a Schiff base.

When such an organic silicon compound having an amino group and an imino group, is used as Component (B), if a compound having an amine equivalent of at most 3,000 (in the case of a derivative of e.g. a Schiff base or a carbamate, this amine equivalent is calculated as the original amine) is employed, the compound itself serves as a vulcanizing agent, and no separate vulcanizing agent may be required. Even in such a case, a separate vulcanizing agent may still be added.

As such Component (B) or (B'), the following compounds may be mentioned. In these formulas, Me is a methyl group, and Vi is a vinyl group. Further, $-C_3H_6N=CH-CH=CHC_6H_5$ is introduced by a dehydration reaction of an amino group and cinnamaldehyde.

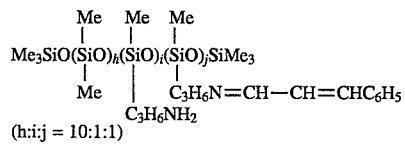

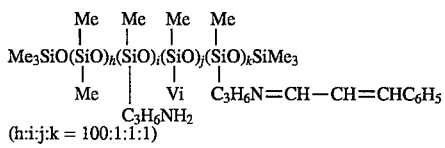

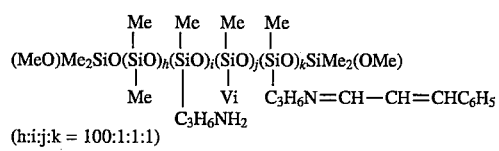

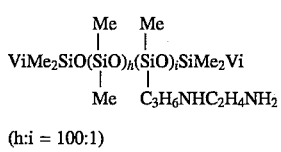

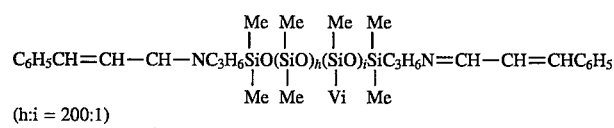

The vulcanizing agent of Component (C) to be used in the present invention, is selected from those suitable for the vulcanization method of the fluororubber polymer of Component (A).

For example, when Component (A) is a polymer of polyhydroxy-vulcanizable type, a combination of a polyhydroxy compound, an organic onium compound and an acid acceptor is preferably employed as the vulcanizing agent. When Component (A) is a polymer of amine-vulcanizable type, a combination of a polyfunctional amine or its derivative such as a carbamate compound or a Schiff base compound, and an acid acceptor, is preferably used as the vulcanizing agent. Further, when Component (A) is a polymer of peroxide-vulcanizable type, an organic peroxide is employed as the vulcanizing agent.

Especially when Component (B) has an alkenyl group, it is preferred to employ an organic peroxide as the vulcanizing agent. In such a case, the alkenyl group in Component (B) is preferably a vinyl group.

Further, in such a case, the fluororubber polymer of Component (A) is also preferably a polymer of organic peroxide-vulcanizable type. As a fluororubber polymer of organic peroxide-vulcanizable type, a polymer having an unsaturated bond or a halogen atom such as iodine or bromine in its molecule may be mentioned.

The introduction of the halogen atom such as iodine or bromine can be accomplished by copolymerizing a monomer containing a halogen atom such as iodine or bromine. Further, the unsaturated bond can be introduced by heat treating the fluororubber polymer in the presence of an oxygen and subjecting it to dehydro fluoride treatment in the presence of an onium compound.

Further, fluororubber polymers vulcanizable by organic peroxides are commercially available under tradenames Viton (Dupont Company), Daiel (Daikin Company) and Tecnoflon (Montefluos Company).

As the organic peroxide, the one capable of readily generating radicals in the presence of heat or an oxydation-reduction system, is preferred. For example, there may be mentioned 1,1-bis(t-butylperoxy)-3,5,5-trimethylcyclohexane, 2,5-dimethylhexane-2,5-dihydroxyperoxide, di-t-butylperoxide, t-butylcumylperoxide, dicumylperoxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoylperoxide, t-butylperoxybenzene, and t-butylperoxyisopropyl carbonate. Among them, a dialkyl-type compound is preferred. The type and the amount of the organic peroxide are selected usually depending upon the amount of active —O—O—, the decomposition temperature, etc.

In the vulcanization with an organic peroxide, a crosslinking assisting agent or a co-crosslinking agent may suitable be used to obtain better effects. As such an agent, any agent may be basically effective so long as it has a reaction activity to peroxy radicals and polymer radicals, and there is no particular restriction as to the type of the agent. Preferred examples include triallyl cyanurate, triallyl isocyanurate, triacryl formal, triallyl trimellitate, N,N-m-phenylenebismaleimide, dipropargyl terephthalate, diallyl phthalate, tetraallyl terephthalate and triallyl phosphate.

Further, by incorporating an organopolysiloxane as Component (D), it is possible to improve the low temperature flexibility while attaining adequate mechanical strength. Here, the organopolysiloxane of Component (D) is a linear or branched silicone compound of the formula:

$$R_a SiO_{(4-a)/2}$$

wherein R is a group selected from the group consisting of a substituted or unsubstituted monovalent hydrocarbon group, a hydrogen atom, a hydroxyl group and an alkoxy group, and $1 < a < 3$. It includes, for example, dimethylpolysiloxane, a dimethylsiloxanemethylvinylsiloxane copolymer, methylhydrogenpolysiloxane, a dimethylsiloxanemethylhydrogensiloxane copolymer, a dimethylsiloxanemethylphenylsiloxane-methylvinylsiloxane copolymer, 3,3,3-trifluoropropylmethylpolysiloxane, and a 3,3,3-trifluoropropylmethylsiloxane-methylvinylsiloxane copolymer. These organopolysiloxanes may be used alone or in combination as a mixture of two or more of them.

With respect to the amounts of the respective components, Component (B) is used in an amount of from 0.1 to 300 parts by weight per 100 parts by weight of Component (A), and Component (C) is used in an amount sufficient to vulcanize Component (A) (and Component (C)). Component (D) is used preferably in an amount of from 3 to 3,000 parts by weight per 100 parts by weight of Component (A). If the amount of Component (B) is too small, no adequate improvement in the low temperature flexibility can be obtained, and no adequate covulcanization tends to be accomplished at the time of blending with silicone rubber. If Component (D) is too much, the properties of the fluororubber tends to deteriorate, such being undesirable.

Preferably, Components (B) and (C) are used in amounts of from 10 to 100 parts by weight and from 0.1 to 10 parts by weight, respectively, per 100 parts by weight of Component (A). Further, Component (D) is used preferably in a weight ratio of Component (A)/Component (D) within a range of from 30/70 to 70/30.

The composition of the present invention may contain, in addition to the above components, conventional additives for rubber, such as a filler, a processing aid, a vulcanizing aid, a pigment, an internal releasing agent and an antioxidant.

The composition of the present invention can be prepared by kneading Components (A), (B), (C) and, if necessary, (D) by a conventional rubber kneader. In such a case, all the components may simultaneously be kneaded. Otherwise, Components (A), (B) and (C) may preliminarily be kneaded, and other components may be added and kneaded therewith. During this kneading, the reaction of Components (A) and (B) is believed to proceed at least partially. The composition thus kneaded is free from bleeding out even when stored for a long period of time.

As the kneader to be used, a Banbury mixer, a compress-kneader or an open kneader may be employed.

Now, the present invention will be described in further detail with reference to Examples. However, it should be understood that the present invention is by no means restricted by such specific Examples. In the following Examples, "parts" means "parts by weight" unless otherwise specified. Further, components used in the following Examples are as follows.

Fluororubber Polymer

A-1: Tecnoflon NMW (polyhydroxy-vulcanizable type, manufactured by Montefluos Company)

A-2: Viton B-50 (amine-vulcanizable type, manufactured by Dupont Company)

A-3: Tecnoflon P-1 (organic peroxide-vulcanizable type, manufactured by Montefluos Company)

A-4: Viton GF (organic peroxide-vulcanizable type, manufactured by Dupont Company)

B-1:
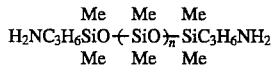
(Viscosity: 500 centistokes)

B-2:
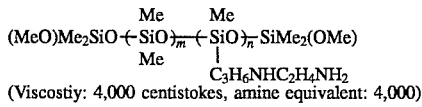
(Viscostiy: 4,000 centistokes, amine equivalent: 4,000)

B-3:

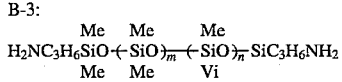

(Viscosity: 1,000 centistokes, m:n = 100:1)

B-5:

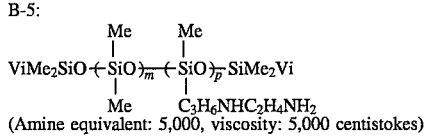

(Amine equivalent: 5,000, viscosity: 5,000 centistokes)

B-7:

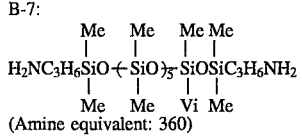

(Amine equivalent: 360)

B-9:

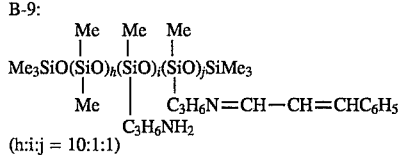

(h:i:j = 10:1:1)

B-11:

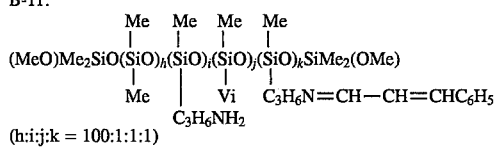

(h:i:j:k = 100:1:1:1)

B-13:

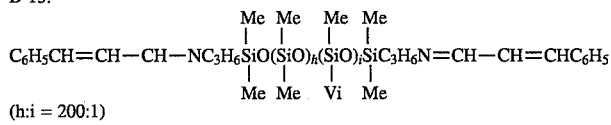

(h:i = 200:1)

B-4:

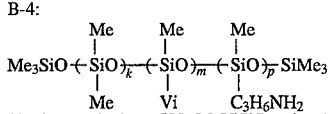

(Amine equivalent: 500, MeViSiO units: 1 mol %, viscosity: 1,000 centistokes)

B-6:

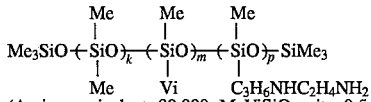

(Amine equivalent: 80,000, MeViSiO units: 0.5 mol %, viscosity: 50,000 centistokes)

B-8:

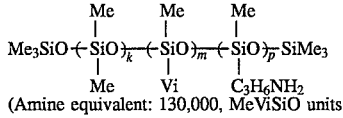

(Amine equivalent: 130,000, MeViSiO units: 0.5 mol %, viscosity: 100,000 centistokes)

B-10:

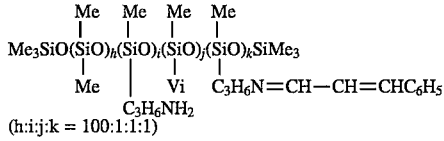

(h:i:j:k = 100:1:1:1)

B-12:

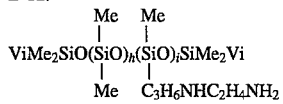

(h:i = 100:1)

In the above formulas, Me is a methyl group, and Vi is a vinyl group.

Vulcanizing Agent

C-1: Tecnoflon M1 (manufactured by Montefluos Company)

C-2: Tecnoflon M2 (manufactured by Montefluos Company)

C-3: Perhexa 2,5B (manufactured by Nippon Oil and Fat Company)

C-4: Diak No. 3 (manufactured by Dupont Company)

Organopolysiloxane

D-1:

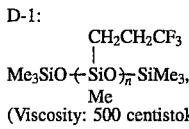

(Viscosity: 500 centistokes)

D-2:

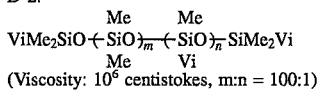

(Viscosity: 10⁶ centistokes, m:n = 100:1)

D-3:

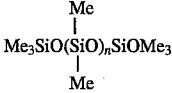

(Viscosity: 10,000 centistokes)

D-4:

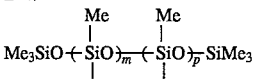

(MeViSiO units: 1 mol %, viscosity: 1,000,000 centistokes)

In the above formula, Me is a methyl group, and Vi is a vinyl group.

Further, MgO #150 indicates magnesium oxide #150, MgO #30 indicates magnesium oxide #30, CW indicates carnauba wax, and TAIC indicates a triallyl isocyanurate.

EXAMPLES 1 TO 27

Each composition as identified in Tables 1 to 3 was mixed by a kneader, and a uniform rubber thereby obtained was discharged. Then, the discharged rubber was wound on a two roll mill, whereupon the processability was evaluated. Further, after sheeting out, bleeding on the surface was inspected. With respect to the roll processability, symbol ○ indicates "good", symbol Δ indicates "adhesion to the two roll mill observed", and symbol X indicates "requires a time until the rubber is wound on the two roll mill".

Then, the sheeted product was subjected to compression mold vulcanization (at 170° C. for 10 minutes) and then to secondary vulcanization (at 230° C. for 8 hours in an oven), whereupon the physical properties of the vulcanizate were evaluated. The results are shown in Tables 1 to 3.

The hardness (JIS-A), tensile strength (kgf/cm$^2$) and elongation (%) were measured in accordance with JIS K6301.

For the heat resistance, the sample was heat-treated at 230° C. for 70 hours, whereby the change in the hardness, the change in the tensile strength (%) and the change in the elongation (%) were measured.

The low temperature characteristic was measured in accordance with ASTM D1329 (TR-10) (°C.).

TABLE 1

| Components (parts by weight) | Examples |||||||||| 
| | 1 | 2 | 3 | 4 | 5 | 6 | 7 | 8 | 9 | 10 |
|---|---|---|---|---|---|---|---|---|---|---|
| A-1 | 100 | — | — | 100 | — | 100 | — | — | 100 | — |
| A-3 | — | 100 | — | — | 100 | — | 100 | — | — | 100 |
| A-2 | — | — | 100 | — | — | — | — | 100 | — | — |
| B-1 | 5 | 5 | 5 | — | — | — | — | — | — | — |
| B-2 | — | — | — | 10 | — | — | — | — | — | — |
| B-3 | — | — | — | — | 20 | — | — | — | — | — |
| D-1 | — | — | — | — | — | — | — | — | 5 | — |
| D-2 | — | — | — | — | — | — | — | — | — | 10 |
| MT carbon | 20 | 20 | 20 | 20 | 20 | 20 | 20 | 20 | 20 | 20 |
| C-1 | 3 | — | — | 3 | — | 3 | — | — | 3 | — |
| C-2 | 2 | — | — | 2 | — | 2 | — | — | 2 | — |
| MgO#150 | 3 | — | 15 | 3 | — | 3 | — | 15 | 3 | — |
| Calcium hydroxide | 6 | — | — | 6 | — | 6 | — | — | 6 | — |
| CW | 1 | — | — | 1 | — | 1 | — | — | 1 | — |
| Zinc oxide | — | 3 | — | — | 3 | — | 3 | — | — | 3 |
| TAIC | — | 3 | — | — | 3 | — | 3 | — | — | 3 |
| C-3 | — | 2 | — | — | 2 | — | 2 | — | — | 2 |
| C-4 | — | — | 3 | — | — | — | — | 3 | — | — |
| Roll prosessability | ○ | ○ | ○ | ○ | ○ | ○ | ○ | Δ | X | X |
| Bleeding of silicone | Nil | Nil | Nil | Nil | Nil | Nil | Nil | Nil | Observed | Observed |
| Initial physical properties | | | | | | | | | | |
| Hardness (JIS-A) | 75 | 77 | 75 | 74 | 75 | 77 | 79 | 78 | 77 | 79 |
| Tensile strength (kgf/cm2) | 170 | 185 | 165 | 170 | 175 | 180 | 190 | 180 | 180 | 180 |
| Elongation (%) | 240 | 250 | 220 | 250 | 260 | 230 | 240 | 220 | 210 | 220 |
| Heat resistance (230° C., 70 hr) | | | | | | | | | | |
| Change in hardness | +1 | ±0 | +1 | +2 | +1 | ±0 | ±1 | +1 | +3 | +2 |
| Change in tensile strength (%) | −3 | +2 | +3 | −6 | −10 | −1 | +4 | +3 | −20 | −24 |
| Change in elongation | −5 | −2 | +3 | −8 | −12 | −5 | −3 | −5 | −22 | −33 |
| Volume change (%) (Feul C, 40° C., 48 hr) | +10 | +11 | +10 | +14 | +19 | +6 | +6 | +7 | +24 | +38 |
| TR-10 (°C.) | −19 | −19 | −18 | −21 | −24 | −15 | −14 | −14 | −16 | −17 |

TABLE 2

| Components (parts by weight) | Examples ||||||| 
| | 11 | 12 | 13 | 14 | 15 | 16 | 17 |
|---|---|---|---|---|---|---|---|
| A-1 | 100 | — | — | — | — | 100 | — |
| A-3 | — | 100 | — | 100 | 100 | — | 100 |
| A-2 | — | — | 100 | — | — | — | — |

TABLE 2-continued

| Components (parts by weight) | Examples | | | | | | |
|---|---|---|---|---|---|---|---|
| | 11 | 12 | 13 | 14 | 15 | 16 | 17 |
| B-1 | 5 | 5 | — | — | — | — | — |
| B-2 | — | — | 5 | — | — | — | — |
| B-3 | — | — | — | 10 | 20 | — | — |
| D-1 | 5 | — | 15 | 20 | — | 20 | — |
| D-2 | — | 20 | — | — | 30 | — | 30 |
| MT carbon | 20 | 20 | 20 | 20 | 20 | 20 | 20 |
| C-1 | 3 | — | — | 3 | — | 3 | — |
| C-2 | 2 | — | — | 2 | — | 2 | — |
| MgO#150 | 3 | — | 15 | 3 | — | 3 | — |
| Calcium hydroxide | 6 | — | — | 6 | — | 6 | — |
| CW | 1 | — | — | 1 | — | 1 | — |
| Zinc oxide | — | 3 | — | — | 3 | — | 3 |
| TAIC | — | 3 | — | — | 3 | — | 3 |
| C-3 | — | 2 | — | — | 2 | — | 2 |
| C-4 | — | — | 3 | — | — | — | — |
| Roll prosessability | O | O | O | O | O | X | X |
| Bleeding of silicone | Nil | Nil | Nil | Nil | Nil | Observed | Observed |
| Initial physical porperties | | | | | | | |
| Hardness (JIS-A) | 75 | 73 | 74 | 73 | 60 | 75 | 77 |
| Tensile strength (kgf/cm2) | 170 | 175 | 165 | 170 | 165 | 170 | 145 |
| Elongation, (%) | 240 | 260 | 240 | 250 | 280 | 210 | 230 |
| Heat resistance (230° C., 70 hr) | | | | | | | |
| Change in hardness | +1 | +1 | ±0 | +2 | +3 | +7 | +6 |
| Change in tensile strength (%) | −3 | −4 | −2 | −8 | −12 | −20 | −45 |
| Change in elongation (%) | −5 | −3 | +4 | −10 | −15 | −18 | −55 |
| Volume change (%) | °12 | +27 | +14 | +17 | +62 | +12 | +58 |
| (Feul C, 40° C., 48 hr) | | | | | | | |
| TR-10 (°C.) | −22 | −28 | −24 | −31 | −36 | −19 | −22 |

TABLE 3

| Components (parts by weight) | Examples | | | | | | | | | |
|---|---|---|---|---|---|---|---|---|---|---|
| | 18 | 19 | 20 | 21 | 22 | 23 | 24 | 25 | 26 | 27 |
| A-3 | 100 | 100 | 100 | — | — | 100 | — | 100 | 100 | — |
| A-4 | — | — | — | 100 | 100 | — | 100 | — | — | 100 |
| B-4 | 10 | — | — | — | — | — | — | — | — | — |
| B-5 | — | 20 | — | 20 | — | — | — | — | — | — |
| B-6 | — | — | 30 | — | 30 | — | — | — | — | — |
| B-7 | — | — | — | — | — | — | — | 10 | — | — |
| B-8 | — | — | — | — | — | — | — | — | 20 | — |
| D-4 | — | — | — | — | — | — | — | — | — | 30 |
| MT carbon | 30 | 30 | 30 | 20 | 20 | 30 | 20 | 30 | 30 | 20 |
| MgO#150 | 5 | 5 | 5 | 5 | 5 | — | — | — | 5 | — |
| TAIC | 3 | 3 | 3 | 3 | 3 | 3 | 3 | 3 | 3 | 3 |
| Lead oxide | 3 | 3 | 3 | 3 | 3 | 3 | 3 | 3 | 3 | 3 |
| C-3 | 3 | 3 | 3 | 3 | 3 | 3 | 3 | 3 | 3 | 3 |
| Roll prosessability | O | O | O | O | O | O | O | Δ | X | X |
| Bleeding of silicone | Nil | Nil | Nil | Nil | Nil | Nil | Nil | Nil | Observed | Observed |
| Initial physical properties | | | | | | | | | | |
| Hardness (JIS-A) | 74 | 72 | 70 | 66 | 64 | 75 | 68 | Not measure-able | 73 | 66 |
| Tensile strength (kgf/cm2) | 220 | 210 | 190 | 185 | 175 | 220 | 200 | | 190 | 155 |
| Elongation (%) | 200 | 220 | 220 | 290 | 310 | 190 | 280 | | 200 | 290 |
| Heat resistance (230° C., 70 hr) | | | | | | | | | | |
| Change in hardness | +1 | +2 | +1 | +1 | +2 | +1 | +4 | | +1 | +3 |
| Change in tensile strength (%) | +2 | +1 | +5 | +5 | +6 | +2 | +6 | | −21 | −35 |
| Change in elongation (%) | +5 | −5 | −4 | −7 | −6 | −1 | +1 | | −30 | −43 |
| TR-10 (°C.) | −21 | −24 | −28 | −17 | −21 | −13 | −6 | | −18 | −15 |

EXAMPLES 28 TO 44

In accordance with each composition as identified in Tables 4 and 6, the raw materials other than the vulcanizing agents (C-1) to (C-4) were uniformly mixed by a kneader. The temperature of the mixture reached 80° C. by shear heat generation, and the mixture was mixed in this state for 15 minutes. After taking out from the kneader, the mixture was roughly kneaded by a two roll mill, and if necessary, a vulcanizing agent as identified by (C-1) to (C-4) was added to obtain a uniform composition. In this operation, the winding up property on the two roll mill was examined. Further, after sheeting out, the bleeding of silicone was inspected.

Then, each composition was subjected to press vulcanization at 170° C. for 10 minutes and further to secondary vulcanization at 230° C. for 8 hours in an oven, whereupon the physical properties were evaluated. The results are shown in Tables 5 and 7. The winding property means the winding property to the two roll mill, whereby symbol ○ indicates "good", symbol Δ indicates "adhesion to the two roll mill observed", and symbol X indicates "requires a long time for winding". The bleeding means the presence or absence of the bleeding of silicone. The volume change indicates the volume change after dipping a sample in fuel C (JIS K6301) at 40° C. for 48 hours. The hardness, tensile strength and elongation were measured in accordance with JIS K6301, and the low temperature characteristic was measured in accordance with ASTM D1329 (TR-10) (°C.).

TABLE 4

| Components (parts by weight) | Examples | | | | | | | | | |
|---|---|---|---|---|---|---|---|---|---|---|
| | 28 | 29 | 30 | 31 | 32 | 33 | 34 | 35 | 36 | 37 |
| A-1 | 100 | — | — | 100 | 100 | — | — | 50 | — | 100 |
| A-2 | — | 100 | — | — | — | — | 100 | 50 | 100 | — |
| A-3 | — | — | 100 | — | — | 100 | — | — | — | — |
| B-9 | 10 | — | — | — | — | — | — | — | — | — |
| B-10 | — | — | 5 | 10 | 15 | — | 10 | — | — | — |
| B-11 | — | 15 | — | — | — | — | — | — | — | — |
| B-12 | — | — | — | — | — | 5 | 10 | — | 10 | 10 |
| B-13 | — | — | — | — | — | 5 | 10 | — | 10 | 5 |
| D-3 | — | — | — | — | — | — | — | — | — | — |
| D-4 | — | — | — | — | — | — | — | — | — | — |
| MT carbon | 25 | 25 | 25 | 25 | 25 | 25 | 25 | 25 | 25 | 25 |
| MgO#150 | — | — | — | 3 | — | — | — | — | — | 3 |
| MgO#30 | — | 15 | — | — | — | — | — | — | 15 | — |
| Ca(OH)₂ | — | — | — | 6 | — | — | — | — | — | 6 |
| CW | 1 | — | — | 1 | 1 | — | — | 1 | — | — |
| Zinc oxide | — | — | 3 | — | 3 | 3 | 3 | 3 | — | — |
| TAIC | — | — | 3 | — | 3 | 3 | 3 | 3 | — | — |
| C-1 | — | — | — | 3 | — | — | — | — | — | 3 |
| C-2 | — | — | — | 2 | — | — | — | — | — | 2 |
| C-3 | — | — | 2 | — | 2 | 2 | 2 | 2 | — | — |
| C-4 | — | 3 | — | — | — | — | — | — | 3 | — |

TABLE 6

| Components (parts by weight) | Examples | | | | | | |
|---|---|---|---|---|---|---|---|
| | 38 | 39 | 40 | 41 | 42 | 43 | 44 |
| A-1 | 100 | — | — | 100 | — | — | 100 |
| A-2 | — | 100 | — | — | — | 100 | — |
| A-3 | — | — | 100 | — | 100 | — | — |
| B-9 | — | — | — | — | — | — | — |
| B-10 | — | — | — | — | — | — | — |
| B-11 | — | — | — | — | — | — | — |
| B-12 | — | — | — | — | — | — | — |
| B-13 | — | — | — | — | — | — | — |
| D-3 | — | — | — | 10 | — | — | — |
| D-4 | — | — | — | — | 10 | 10 | 10 |
| MT carbon | 25 | 25 | 25 | 25 | 25 | 25 | 25 |
| MgO#150 | 3 | — | — | — | — | — | — |
| MgO#30 | — | 15 | — | — | — | 15 | — |

TABLE 5

| | Examples | | | | | | | | | |
|---|---|---|---|---|---|---|---|---|---|---|
| | 28 | 29 | 30 | 31 | 32 | 33 | 34 | 35 | 36 | 37 |
| Winding property | ○ | ○ | ○ | ○ | ○ | ○ | ○ | ○ | ○ | ○ |
| Bleeding | Nil | Nil | Nil | Nil | Nil | Nil | Nil | Nil | Nil | Nil |
| Initial physical properties | | | | | | | | | | |
| Hardness (JIS-A) | 76 | 74 | 77 | 73 | 72 | 74 | 73 | 75 | 72 | 74 |
| Tensile strength (Kgf/cm2) | 175 | 170 | 195 | 180 | 270 | 185 | 165 | 170 | 170 | 170 |
| Elongation (%) | 220 | 240 | 230 | 230 | 240 | 230 | 230 | 240 | 230 | 230 |
| Heat resistance | | | | | | | | | | |
| Change in hardness | +1 | +2 | ±0 | +1 | +1 | ±0 | +2 | ±0 | +1 | +1 |
| Change in tensile strength (%) | +5 | +2 | +4 | −5 | +2 | +5 | +10 | +5 | +7 | +8 |
| Change in elongation (%) | −4 | +2 | −5 | −5 | +5 | +2 | −5 | −5 | −3 | +2 |
| Volume change (%) | +14 | +17 | +10 | +14 | +16 | +15 | +19 | +15 | +19 | +17 |
| TR-10 (°C.) | −21 | −22 | −18 | −21 | −23 | −20 | −24 | −21 | −24 | −23 |

TABLE 6-continued

| Components (parts by weight) | Examples | | | | | | |
|---|---|---|---|---|---|---|---|
| | 38 | 39 | 40 | 41 | 42 | 43 | 44 |
| Ca(OH)$_2$ | 6 | — | — | — | — | — | — |
| CW | 1 | — | — | 1 | — | — | — |
| Zinc oxide | — | — | 3 | — | 3 | — | 3 |
| TAIC | — | — | 3 | — | 3 | — | 3 |
| C-1 | 3 | — | — | — | — | — | — |
| C-2 | 2 | — | — | — | — | — | — |
| C-3 | — | — | 2 | — | 2 | — | 2 |
| C-4 | — | 3 | — | — | — | 3 | — |

TABLE 7

| | Examples | | | | | | |
|---|---|---|---|---|---|---|---|
| | 38 | 39 | 40 | 41 | 42 | 43 | 44 |
| Winding property | ○ | △ | ○ | X | X | X | X |
| Bleeding | Nil | Nil | Nil | Observed | Observed | Observed | Observed |
| Initial physical properties | | | | | | | |
| Hardness (JIS-A) | 79 | 80 | 80 | Not vulcanizable | 77 | 70 | Inadequate vulcanization |
| Tensile strength (Kgf/cm2) | 190 | 190 | 220 | | 165 | 160 | |
| Elongation (%) | 220 | 240 | 220 | | 200 | 200 | |
| Heat resistance | | | | | | | |
| Change in hardness | ±0 | ±0 | +1 | | +3 | +4 | |
| Change in tensile strength (%) | −1 | +2 | +3 | | −20 | −24 | |
| Change in elongation (%) | −4 | −3 | −5 | | −33 | −35 | |
| Volume change (%) | +6 | +7 | +6 | | +30 | +31 | |
| TR-10 (°C.) | −15 | −14 | −14 | | −16 | −15 | |

The vulcanizable rubber composition of the present invention is free from bleeding of silicone and can easily be processed. Further, after vulcanization, it has excellent characteristics not only in the mechanical strength, heat resistance and low temperature flexibility but also in the oil resistance, chemical resistance, fuel oil resistance and weather resistance, whereby a problem in a conventional method such that the processability is poor and covulcanizability is so low that the blending effects were small, has been solved. Thus, the industrial advantage thereby obtained is very high.

With such excellent characteristics, the rubber composition of the present invention is useful for packings, O-rings, hoses, sealing materials, diaphragms and valves in transportation systems such as automobiles, ships and aircrafts, and it is also useful for similar parts in chemical plants, atomic energy plants or food manufacturing plants. Further, it is useful also for general industrial parts.

What is claimed is:

1. A vulcanizable rubber composition comprising:

(A) 100 parts by weight of a fluororubber polymer containing at least 10 mol % of vinylidene fluoride as co-monomer constituting a fluororubber polymer;

(B) from 0.1 to 300 parts by weight of an organic silicon compound having an amino group and alkenyl group; and (C) an organic peroxide vulcanizing agent in an amount sufficient to vulcanize Component (A).

2. The vulcanizable rubber composition according to claim 1, wherein Component (B) is an amino group-containing organopolysiloxane having at least one alkenyl group per molecule and having an amine equivalent of from 500 to 100,000.

3. The vulcanizable rubber composition according to claim 2, wherein the alkenyl group is a vinyl group.

4. The vulcanizable rubber composition according to claim 1, wherein the amino group in Component (B) is a primary or secondary amino group.

5. The vulcanizable rubber composition according to claim 1, wherein Component (B) is a compound which further contains an imino group.

6. The vulcanizable rubber composition according to claim 1, which further comprises an organic silicon compound Component (B') having an imino group.

7. The vulcanizable rubber composition according to claim 5 or 6, wherein the imino group is an imino group in a schiff base or in a carbamate.

8. The vulcanizable rubber composition according to claim 1, wherein Component (A) is a polymer vulcanizable by organic peroxides.

9. The vulcanizable rubber composition according to claim 1, which further contains an organopolysiloxane having at least two alkenyl groups bonded to silicon per molecule, as Component (D).

10. The vulcanizable rubber composition according to claim 9, wherein the organopolysiloxane of Component (D) is in an amount of from 3 to 3,000 parts by weight per 100 parts by weight of the fluororubber polymer of Component (A).

11. The vulcanizable rubber composition according to claim 1, wherein the organic silicon compound having an amino group of component (B) is an organosiloxane or the formula

wherein $R^1$ is a bivalent hydrocarbon group, $R^2$ is a substituted or unsubstituted monovalent hydrocarbon group, n is 0 or a positive integer of not more than 4, $0<a\leq3$, $0\leq b<3$, and $0<a+b\leq3$, and/or an organosilane of the formula

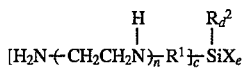

wherein $R^1$, $R^2$ and n are as defined above, X is a hydrolyzable group selected from the group consisting of a hydroxyl group, a halogen atom and a $C_{1-10}$ alkoxy group, c is 1, 2 or 3, d is 0, 1 or 2, e is 1, 2 or 3 and c+d+e=4 or a partial hydrolyzate thereof; wherein at least one $R^2$ per molecule of Component (B) is an alkenyl group.

* * * * *